Sept. 1, 1925.
A. T. MOE
1,552,222
RUNNER ATTACHMENT FOR VEHICLE WHEELS
Filed Dec. 14, 1921
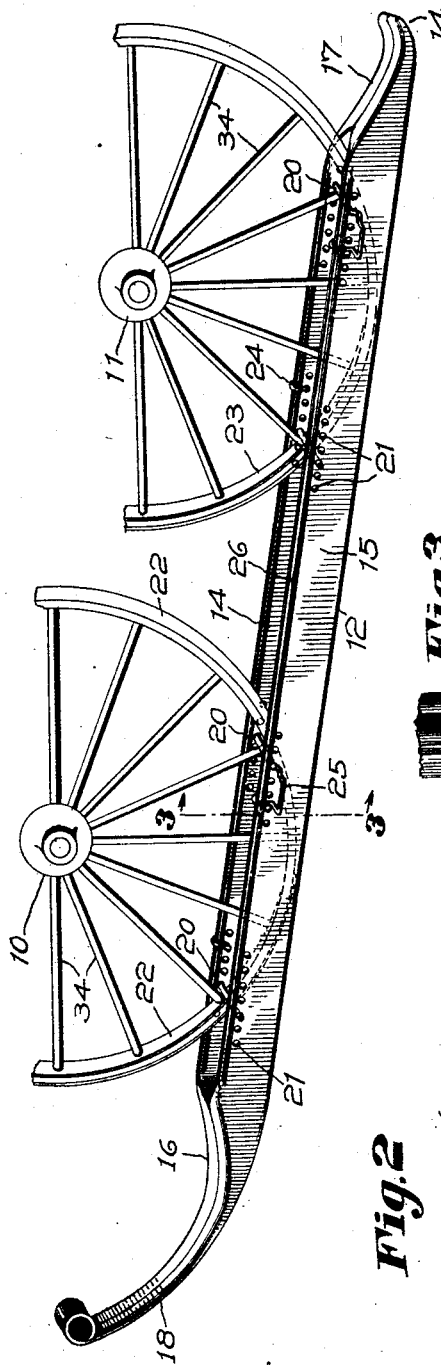
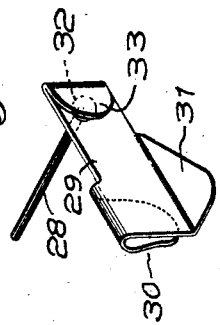
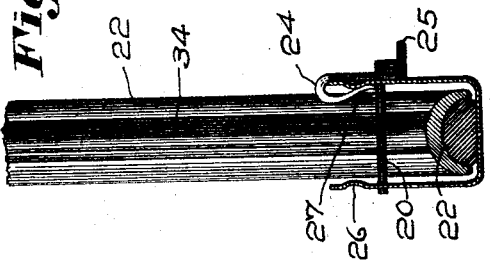
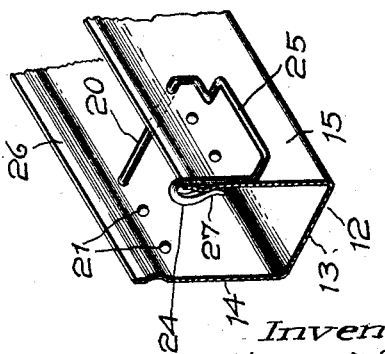
Inventor:
Andreas T. Moe
by Robt. T. Harris
Attorney Patented Sept. 1, 1925.

1,552,222

UNITED STATES PATENT OFFICE.

ANDREAS T. MOE, OF MELROSE, MASSACHUSETTS.

RUNNER ATTACHMENT FOR VEHICLE WHEELS.

Application filed December 14, 1921. Serial No. 522,204.

*To all whom it may concern:*

Be it known that I, ANDREAS T. MOE, a citizen of the United States, residing at Melrose, in the county of Middlesex and State of Massachusetts, have invented an Improvement in Runner Attachments for Vehicle Wheels, of which the following description, in connection with the accompanying drawings, is a specification, like characters on the drawings representing like parts.

This invention relates to runners that may be readily secured to and removed from vehicle wheels, and more particularly to runners adapted to be applied to the wheels of baby-carriages, baby-carts and other small vehicles.

As is well known, it is much easier to propel a vehicle through snow when it is mounted upon runners than it is when mounted upon wheels that sink into the snow. It is therefore desirable to provide inexpensive means by which baby-carriages and baby-carts may be placed upon runners, and since it may be desirable to apply runners to the vehicle and remove them therefrom a number of times during a winter, it is important that the construction be such that the runners may be easily and quickly secured to and removed from the wheels of the vehicle.

Various types of runner attachments for vehicle wheels have been proposed heretofore but they have been difficult to apply to the wheels and otherwise unsatisfactory.

An important object of the present invention therefore is to provide runners which are simple in construction, inexpensive to manufacture and which may be easily and quickly attached to and removed from the wheels of a vehicle.

Another important object of the invention is to provide novel means for detachably securing a runner to the wheels of a vehicle.

The above and other objects of the invention and novel combination of parts will be herein described in connection with the accompanying drawings which show the preferred form of the invention.

In the drawings:

Fig. 1 is a perspective view of a runner constructed and secured to the front and rear wheels of a vehicle in accordance with the present invention.

Fig. 2 is an enlarged perspective view of a portion of the runner.

Fig. 3 is an enlarged sectional view taken on line 3—3 of Fig. 1; and

Fig. 4 is an enlarged perspective view of a modification to be described.

In the drawings 10 and 11 are the front and rear wheels respectively of a vehicle, such as a baby-carriage, to which it is desired to secure the runner 12.

The runner 12 preferably is constructed of a relatively long narrow strip of sheet metal having its sides bent upwardly to form a channel-iron having the bottom wall 13 and the side walls 14 and 15. The side walls 14 and 15 are spaced apart sufficiently to comfortably receive the wheels 10 and 11 within the channel of the runner, and the side walls preferably are bent inwardly at the ends of the runner into overlapping relation as at 16 and 17. By bending the side walls inwardly at the ends, the runner is given a pleasing appearance, and the end portions 18 and 19 which are bent upwardly are stiffened materially by the overlapping walls, and by the gradual merging of the side walls into the flattened end portions of the runner.

The runner 12 is of sufficient length to provide a channel that will readily receive the front and rear wheels of the vehicle as shown in Fig. 1, and the runner may be easily and quickly secured to the wheels by pins 20 insertable through holes 21 in the side walls 14 and 15, the pins being so positioned that they extend across the inner face of the felloes 22 and 23 of the wheels. The wheels to which the runner 12 is applied may vary in diameter and in the distance between the front and rear axle, but this variation may be taken care of by providing a series of holes 21 in the walls 14 and 15 to receive the pins 20. Four pins are sufficient to secure the runner 12 to the wheels 10 and 11, and the pins should be so positioned that one will engage the felloe of the wheel in front of the position directly below the axle of the wheel and the other pin will engage the wheel behind this position, as clearly shown in Fig. 1.

It is important to provide means for securing the pins in place so that they can not work out, and it is also important that the means for retaining the pins in place be simple in construction and easily manipulated by hand. Simple and satisfactory means to this end comprises clips 24 connected to the pins 20 and arranged to straddle either side wall of the runner 12. The clip and pin may be conveniently formed of wire having a straight portion forming the pin, a laterally extending portion 25, and the clip or wall engaging portion 24. The portion 25 preferably lies in spaced relation to the wall of the runner that it may be readily grasped by the fingers. The clip 24 is sufficiently resilient to frictionally engage the wall of the runner so that it will remain in engagement therewith, and the clips may be further secured in place by forming ribs 26 extending lengthwise of the walls 14 and 15 over which the inwardly directed end 27 of the clip passes, as clearly shown in Figs. 2 and 3.

In some cases it may be desirable to construct the clip for retaining the pin in place as shown in Fig. 4. In this construction the pin 28 may be inserted through a strip of metal 29 and this strip of metal may have a bent over portion 30 forming the wall engaging clip, and may have a laterally extending portion 31 that may be grasped by the fingers. The pin 28 may have a head 32 retained between one face of the strip 29 and a rearwardly bent portion 33.

It will be understood that the front and rear wheels on the opposite side of the vehicle will be provided with a second runner similar to the one shown, and it will be apparent that the runner 12 may be readily secured to the wheels 10 and 11 by inserting the four pins 20, and may be released from the wheels by removing these pins. It will also be apparent that the wheels 10 and 11 are prevented from rotating or creeping within the runner 12 by engagement of one or more of the spokes 34 with the pins 20.

As stated the runners of the present invention are designed more particularly for use upon baby carriages and baby-carts. These carriages and carts are propelled by a person walking behind them and pushing upon a handle that is well elevated from the ground. As a result, if the front wheels of the carriage or cart are being pushed through snow the pressure upon the handle is likely to tilt the carriage or cart over frontwardly. To avoid this the runners 12 are constructed so that they extend frontwardlly a substantial distance beyond the front wheels 10 before they curve upwardly, as clearly shown in Fig. 1.

What is claimed is:—

1. A detachable runner for the pair of wheels at a side of a baby carriage, comprising in combination, a sheet metal channel-iron substantially U-shaped in cross section and of sufficient length to receive both wheels upon one side of the carriage within the channel and to extend a considerable distance beyond the wheels, the forward end of the channel iron being turned up at a substantial distance in front of the forward wheel to prevent the carriage from tilting frontwardly and being stiffened by bending inwardly the sides of the channel-iron into overlapping relation so that they form inclined braces for the upwardly bent end portion, and means for securing the runner to the felly of the wheels to secure the wheels within the channel of the runner so that the front wheel is spaced from said turned-up end.

2. A detachable runner for the wheels at a side of a baby carriage, comprising in combination, a sheet metal channel iron substantially U-shaped in cross section and of sufficient length to receive both wheels upon one side of the carriage within the channel and to extend a considerable distance beyond the wheels, bead-like ribs formed longitudinally of the sides of the runner to stiffen the sides, the forward end of the channel iron being turned up at a substantial distance in front of the forward wheel to prevent the carriage from tilting frontwardly and being stiffened by the metal of the side walls, a pin insertable thru the side walls of the channel-iron to engage the felly of a wheel, and a clip upon the pin for holding the pin in place and having a yielding portion constructed to straddle a side wall of the runner and grip said rib.

In testimony whereof, I have signed my name to this specification.

ANDREAS T. MOE.